(12) United States Patent
Kim et al.

(10) Patent No.: US 12,130,518 B2
(45) Date of Patent: Oct. 29, 2024

(54) DISPLAY DEVICE

(71) Applicant: LG ELECTRONICS INC., Seoul (KR)

(72) Inventors: Jaehyeok Kim, Seoul (KR); Daewon Kang, Seoul (KR); Taeseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/039,064

(22) PCT Filed: Nov. 27, 2020

(86) PCT No.: PCT/KR2020/017133
§ 371 (c)(1),
(2) Date: May 26, 2023

(87) PCT Pub. No.: WO2022/114298
PCT Pub. Date: Jun. 2, 2022

(65) Prior Publication Data
US 2023/0418107 A1    Dec. 28, 2023

(51) Int. Cl.
*G02F 1/13357* (2006.01)
*G02F 1/1335* (2006.01)

(52) U.S. Cl.
CPC .. *G02F 1/133608* (2013.01); *G02F 1/133612* (2021.01)

(58) Field of Classification Search
CPC ............ G02F 1/133608; G02F 1/133612
See application file for complete search history.

(56) References Cited

U.S. PATENT DOCUMENTS

| 10,754,092 | B1 * | 8/2020 | Ward ................ G02B 6/12007 |
| 11,592,707 | B2 * | 2/2023 | Kong .................... G02F 1/1333 |
| 2018/0136521 | A1 | 5/2018 | Nakaki et al. |
| 2020/0159071 | A1 * | 5/2020 | Yoon ................ G02F 1/133504 |
| 2020/0287106 | A1 * | 9/2020 | Xie ....................... H01L 27/156 |

(Continued)

FOREIGN PATENT DOCUMENTS

| EP | 2741341 A1 * | 6/2014 | ............. H01L 24/97 |
| KR | 10-2010-0091384 | 8/2010 | |

(Continued)

OTHER PUBLICATIONS

English translation of Park KR-20100091384-A, Published Aug. 2010 (Year: 2010).*

(Continued)

*Primary Examiner* — Evan P Dzierzynski
(74) *Attorney, Agent, or Firm* — LEE, HONG, DEGERMAN, KANG & WAIMEY

(57) ABSTRACT

A display device that includes: a display panel; a frame disposed at a rear of the display panel; a substrate disposed between the display panel and the frame; and a light source mounted on the substrate. The substrate includes: a first substrate; a conductive layer located on the first substrate; a second substrate located on the conductive layer; and a light source groove formed in a portion of the second substrate to permit a portion of the conductive layer to be exposed therethrough. The light source is disposed in the light source groove and is electrically connected to the conductive layer.

7 Claims, 21 Drawing Sheets

(56) References Cited

U.S. PATENT DOCUMENTS

2020/0303591 A1* 9/2020 White .................. H01L 33/405
2023/0418107 A1* 12/2023 Kim ................. G02F 1/133603

FOREIGN PATENT DOCUMENTS

| KR | 20100091384 A * | 8/2010 |
|----|----|----|
| KR | 10-2013-0000067 | 1/2013 |
| KR | 10-2013-0013970 | 2/2013 |
| KR | 10-2016-0051567 | 5/2016 |
| WO | 2009-082079 | 7/2009 |
| WO | 2010-002226 | 1/2010 |
| WO | 2020-101946 | 5/2020 |

OTHER PUBLICATIONS

PCT International Application No. PCT/KR2020/017133, International Search Report dated Jul. 16, 2021, 7 page.
European Patent Office Applications Serial Number 20963693.5, Search Report dated Jul. 2, 2024, 8 pages.

\* cited by examiner

1240

DISPLAY DEVICE

CROSS-REFERENCE TO RELATED APPLICATION(S)

This application is the National Stage filing under 35 U.S.C. 371 of International Application No. PCT/KR2020/017133, filed on Nov. 27, 2020, the contents of which are hereby incorporated by reference herein in its entirety.

TECHNICAL FIELD

The present disclosure relates to a display device.

BACKGROUND ART

With the development of information society, there is an increasing demand for various types of display devices. In order to meet such demand, various display devices, such as a Liquid Crystal Display (LCD), a Plasma Display Panel (PDP), an Electro luminescent Display (ELD), a Vacuum Fluorescent Display (VFD), an Organic Light-Emitting Diode (OLED), and the like, have been developed and used.

Among these devices, a liquid crystal display panel of the LCD includes a liquid crystal layer, and a thin film transistor (TFT) substrate and a color substrate that are disposed to face each other with the liquid crystal layer interposed therebetween. The liquid crystal display panel can display an image using light provided by a backlight unit.

Recently, as the display devices provide images with a higher quality, research on a backlight unit that provides light to a display panel is being actively conducted.

As an example, while an image quality provided by the display device is increased from 4K to 8K, light transmittance of the display panel decreases (e.g., about 50%). Thus, there is an increasing need for a backlight unit that can effectively provide more light to the display panel in order to maintain a uniform brightness of an image provided by the display panel.

As another example, while an image quality provided by the display device is increased from 4K to 8K, light transmittance of the display panel decreases (e.g., about 50%). Therefore, there is an increasing need for a backlight unit that can effectively dissipate a lot of heat generated as the display panel provides more light to maintain a uniform brightness of an image provided by the display panel.

DISCLOSURE

Technical Problem

It is an objective of the present disclosure to solve the above and other problems.

It is another objective of the present disclosure to provide a display device with improved light efficiency of a backlight unit.

It is yet another objective of the present disclosure to provide a display device with improved reliability of a backlight unit.

It is yet another objective of the present disclosure to provide a display device that can reduce power consumed by a backlight unit.

It is yet another objective of the present disclosure to provide a display device that can allow the space efficiency to be improved.

It is yet another objective of the present disclosure to provide a display device that can effectively achieve heat dissipation of a backlight unit.

Technical Solution

According to one aspect of the subject matter described in this application, a display device includes: a display panel; a frame disposed at a rear of the display panel; a substrate disposed between the display panel and the frame; and a light source mounted on the substrate and configured to provide light to the display panel, wherein the substrate includes: a first substrate; a conductive layer stacked on the first substrate; a second substrate stacked on the conductive layer; and a light source groove formed by removing a portion of the second substrate to allow the conductive layer to be exposed therethrough, and wherein the light source is disposed in the light source groove and is electrically connected to the conductive layer.

Advantageous Effects

A display device according to the present disclosure has the following effects.

According to at least one of the embodiments of the present disclosure, a display device with improved light efficiency of a backlight unit may be provided.

According to at least one of the embodiments of the present disclosure, a display device with improved reliability of a backlight unit may be provided.

According to at least one of the embodiments of the present disclosure, a display device capable of reducing power consumed by a backlight unit may be provided.

According to at least one of the embodiments of the present disclosure, a display device capable of achieving higher space efficiency may be provided.

According to at least one of the embodiments of the present disclosure, a display device capable of effectively achieving heat dissipation of a backlight unit may be provided.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

MODE FOR THE INVENTION

Figure 1:
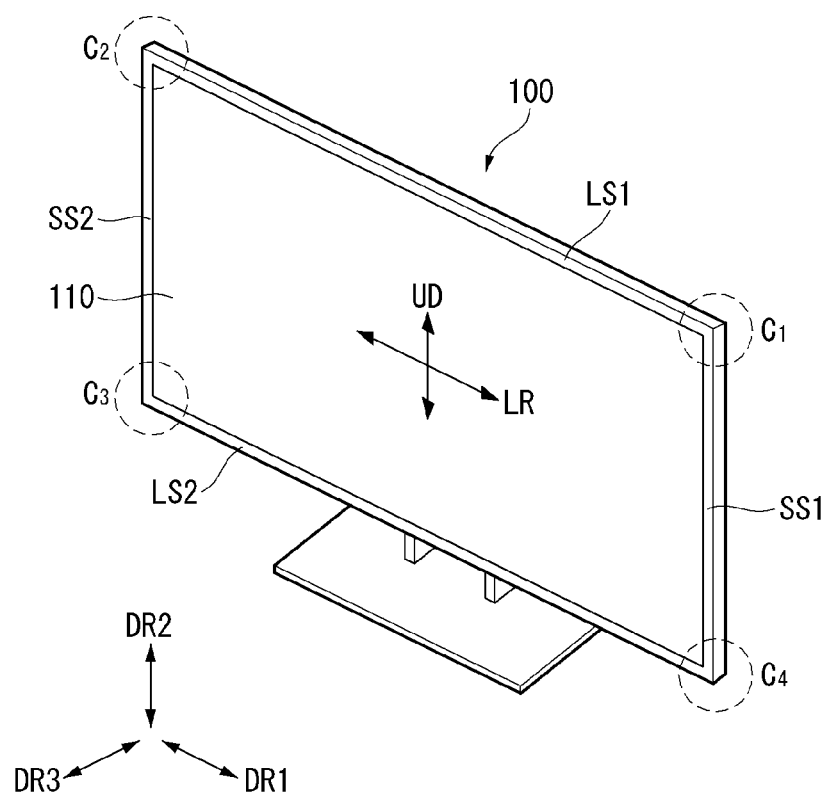
FIGS. 1 to 5 are views illustrating examples of a display device related to the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

Hereinafter, a display panel will be described using a Liquid Crystal Display (LCD) device as an example, but a display panel that may be applied to the present disclosure is not limited to the LCD panel.

In the following description, a display device 100 may include a first long side LS1, a second long side LS2 opposite the first long side LS1, a first short side SS1 adjacent to the first long side LS1 and the second long side LS2, and a second short side SS2 opposite the first short side SS1.

Here, an area of the first short side SS1 may be referred to as a first side area; an area of the second short side SS2 may be referred to as a second side area that is opposite the first side area; an area of the first long side LS1 may be referred to as a third side area that is adjacent to the first side area and the second side area, and is positioned between the first side area and the second side area; and an area of the second long side LS2 may be referred to as a fourth side area that is adjacent to the first side area and the second side area, is positioned between the first side area and the second side area, and is opposite the third side area.

For the convenience of explanation, it is illustrated and described that lengths of the first and second long sides LS1 and LS2 are greater than lengths of the first and second short sides SS1 and SS2, but the lengths of the first and second long sides LS1 and LS2 may be substantially equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side or surface on which the display device 100 displays an image may be referred to as a front, a front surface, or a front side. When the display device 100 displays the image, a side or surface at which the image cannot be viewed may be referred to as a rear, a back, a rear surface, a rear side, a back surface, or a back side. When the display device 100 is viewed from the front or the front surface, the first long side LS1 may be referred to as a top, a top surface, an upper surface, or an upper side, and the second long side LS2 may be referred to as a bottom, a bottom surface, a lower surface, or a lower side. When the display device 100 is viewed from the front or the front surface, the first short side SS1 may be referred to as a right, a right surface, or a right side, and the short side SS2 may be referred to as a left, a left surface, or a left side.

The first long side LS1, the second long side LS2, the first short side SS1, and the second short side SS2 may be referred to as edges of the display device 100. In addition, positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an up and down direction UD.

Figure 2:
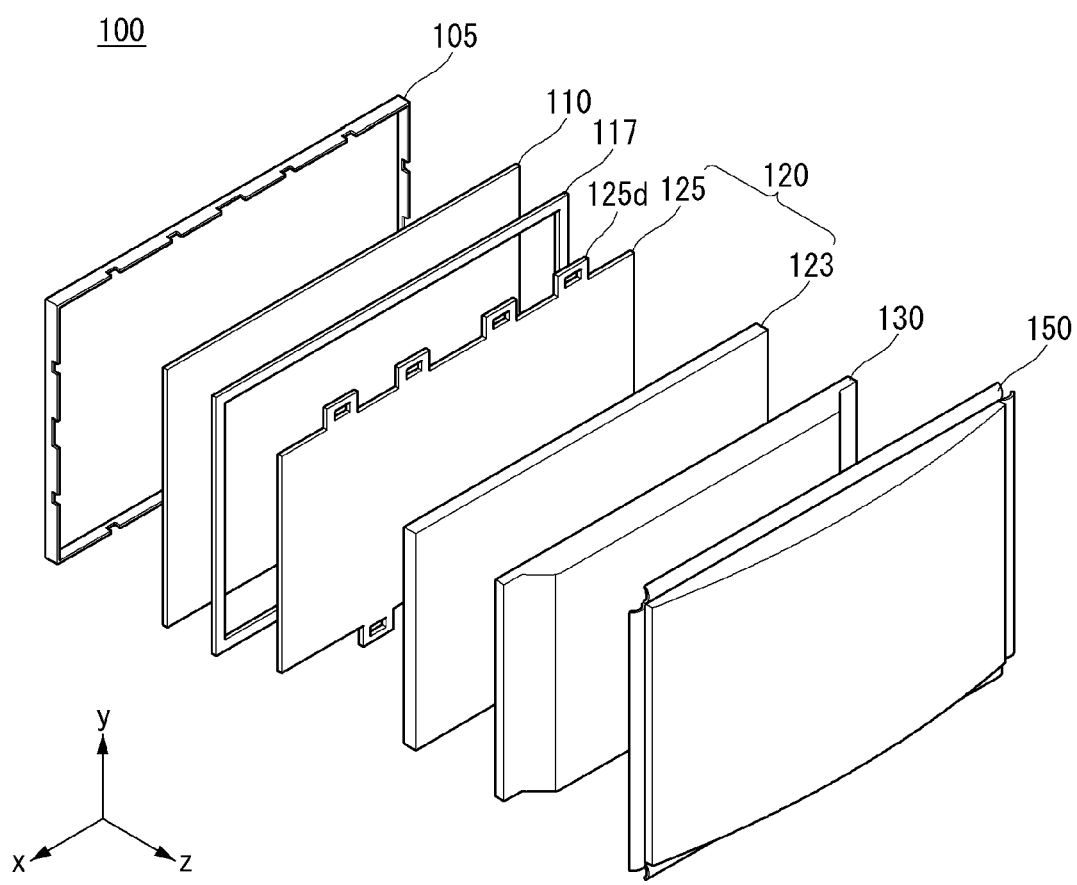

Referring to FIGS. 1 and 2, a display panel 110 may be disposed at the front of the display device 100 to display an image. The display panel 110 may include a plurality of pixels to output an image in accordance with color, brightness, and saturation of each pixel.

The display panel 110 may be divided into an active area in which an image is displayed, and an inactive area in which no image is displayed. The display panel 110 may include a front substrate and a rear substrate that are disposed opposite each other with a liquid crystal layer interposed therebetween.

The front substrate may include a plurality of pixels, each including red (R), green (G), and blue (B) subpixels. The front substrate may generate an image corresponding to a color of red, green, or blue according to a control signal.

The rear substrate may include switching elements. The rear substrate may switch pixel electrodes. For example, the pixel electrode may change a molecular arrangement of a liquid crystal layer according to a control signal applied from the outside. The liquid crystal layer may include a plurality of liquid crystal molecules. The arrangement of the liquid crystal molecules may be changed in response to a voltage difference between the pixel electrode and a common electrode. The liquid crystal layer may transfer light provided from a backlight unit 120 to the front substrate.

A front cover 105 may cover at least a partial area of a front surface or a side surface of the display panel 110. The front cover 105 may have a rectangular frame shape with a hollow center.

The front cover 105 may be divided into a front surface cover and a side surface cover. That is, the front cover 105 be divided into the front surface cover disposed on the front surface of the display panel 110 and the side surface cover disposed on the side surface of the display panel 110. The front surface cover and the side surface cover may be provided separately. Either the front surface cover or the side surface cover may be omitted. For example, for aesthetic design purposes and the like, there may be cases in which only the side surface cover is provided without the front surface cover.

A guide panel 117 may be disposed behind the display panel 110. The guide panel 117 may support a portion of a rear surface of the display panel 110. The guide panel 117 may come into contact with a periphery or outer edge of the display panel 110. The guide panel 117 may be coupled to a frame 130.

A backlight unit 120 may be disposed behind the display panel 110. The backlight unit 120 may include a plurality of light sources. The backlight unit 120 may be of a direct type or an edge type. In the case of an edge-type backlight unit, the backlight unit 120 may further include a light guide part or a light guide panel (LGP).

The backlight unit 120 may be disposed on a front surface of the frame 130. For example, the plurality of light sources may be disposed on the front surface of the frame 130, which may be collectively referred to as a direct-type backlight unit.

The backlight unit 120 may be driven by a full driving scheme or a partial driving scheme such as local dimming, impulsive driving, or the like. The backlight unit 120 may include an optical sheet 125 and an optical layer 123.

The optical sheet 125 may diffuse light from the light sources. The optical sheet 125 may consist of a plurality of layers. For example, the optical sheet 125 may include at least one prism sheet and/or at least one diffusion sheet.

The optical sheet 125 may include at least one coupling portion 125d. The coupling portion 125d may be coupled to the front cover 105, the frame 130, and/or a back cover 150. That is, the coupling portion 125d may be directly coupled to the front cover 105, the frame 130 and/or the back cover 150. Alternatively, the coupling portion 125d may be coupled to a structure coupled onto the front cover 105, the frame 130, and/or the back cover 150. That is, the coupling portion 125d may be indirectly coupled to the front cover 105, the frame 130, and/or the back cover 150.

The optical layer 123 may include a light source and the like. The optical layer 123 will be described in detail in the relevant section.

The frame 130 may support components of the display device 100. For example, the backlight unit 120 and the like may be coupled to the frame 130. The frame 130 may be made of a metal material such as an aluminum alloy or the like.

The back cover 150 may be disposed at the rear of the display device 100. The back cover 150 may protect internal components from the outside. At least a portion of the back cover 150 may be coupled to the frame 130 and/or the front cover 105. The back cover 150 may be an injection-molded product made of a resin material.

Figure 3:
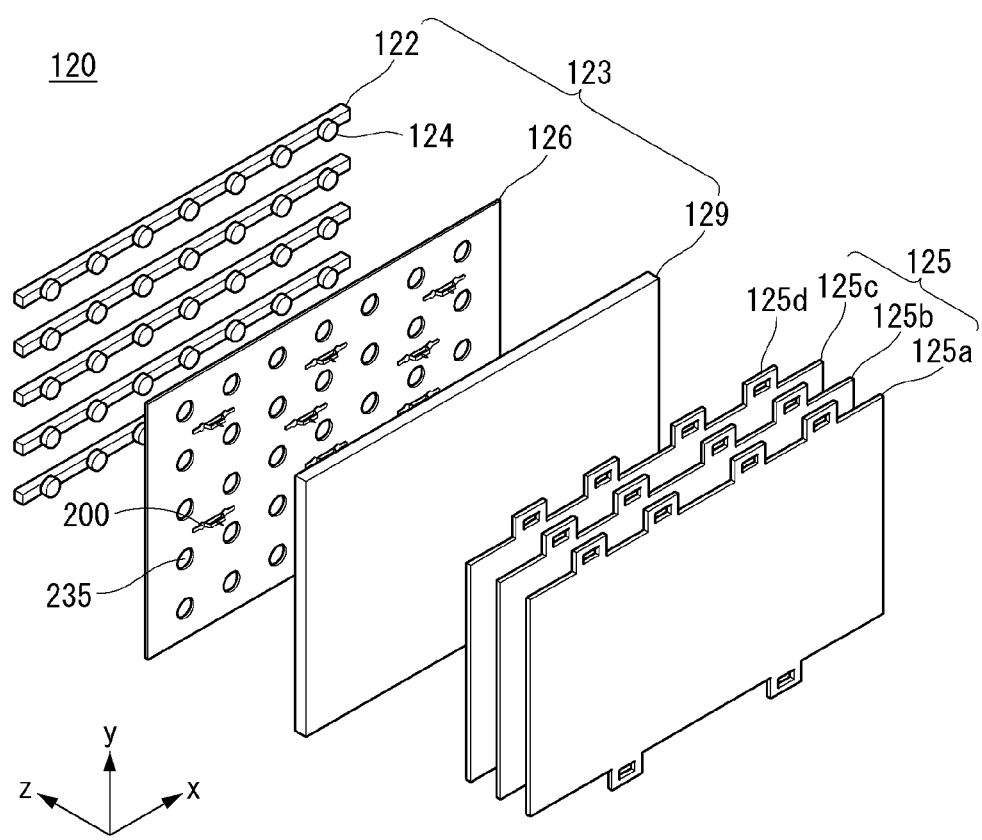

Referring to FIG. 3, the backlight unit 120 may include: the optical layer 123 having a substrate 122, at least one light assembly 124, a reflective sheet 126, and a diffusion plate 129; and the optical sheet 125 disposed in front of the optical layer 123. The components of the backlight unit 120 are not limited thereto, and any one or more of them may be omitted.

The substrate 122 may be configured in the form of a plurality of straps extending in a first direction and spaced apart from each other at predetermined intervals in a second direction perpendicular to the first direction.

At least one light assembly 124 may be mounted on the substrate 122. An electrode pattern for connecting an adapter and the light assembly 124 may be formed on the substrate 122. For example, the electrode pattern may be a carbon nano tube (CNT) electrode pattern.

The substrate 122 may be made of at least one of polyethylene terephthalate (PET), glass, polycarbonate (PC), and silicon. The substrate 122 may be a printed circuit board (PCB).

The light assemblies 124 may be disposed on the substrate 122 at predetermined intervals in the first direction. A diameter of each of the light assemblies 124 may be greater than a width of the substrate 122. In other words, the diameter of the light assembly 124 may be greater than a length of the substrate 122 in the second direction.

The light assembly 124 may be a light emitting diode (LED) chip or an LED package including at least one LED chip.

The light assembly 124 may be configured as a white LED or a colored LED emitting light of at least one of red, blue, and green. The colored LED may include at least one of a red LED, a blue LED, and a green LED.

A light source included in the light assembly 124 may be of a chip-on-board (COB) type. The COB type may be a method in which a light source, namely, an LED chip is directly coupled to the substrate 122. This may allow a manufacturing process to be simplified. Also, resistance may be reduced, thereby reducing the amount of energy lost to heat. In other words, power efficiency of the light assembly 124 may be increased. The COB type may provide brighter lighting. The COB type may be made thinner and lighter than the related art.

The reflective sheet 126 may be disposed on a front surface of the substrate 122. The reflective sheet 126 may have a through-hole 235, and the light assembly may be inserted into the through-hole 235.

The reflective sheet 126 may reflect light, provided from the light assembly 124, forward. In addition, the reflective sheet 126 may reflect light, reflected from the diffusion plate 129, back toward the diffusion plate 129.

The reflective sheet 126 may contain at least one of a metal and a metal oxide as a reflective material. For example, the reflective sheet 126 may include a metal and/or a metal oxide having high reflectivity, such as at least one of aluminum (Al), silver (Ag), gold (Au), and titanium dioxide ($TiO_2$).

The reflective sheet 126 may be formed by depositing and/or coating a metal or a metal oxide on the substrate 122. Ink containing a metal material may be printed on the reflective sheet 126. The reflective sheet 126 may include a deposition layer formed using a vacuum deposition method such as thermal deposition, evaporation, or sputtering. The reflective sheet 126 may include a coated layer and/or a printed layer formed by printing, gravure coating, or silk screening.

An air gap may be positioned between the reflective sheet 126 and the diffusion plate 129. The air gap may serve to allow light emitted from the light assembly 124 to spread widely. In order to maintain the air gap, a supporter 200 may be disposed between the reflective sheet 126 and the diffusion plate 129. The air gap may be referred to as an optical gap.

A resin may be deposited on the light assembly 124 and/or the reflective sheet 126. The resin may serve to spread light emitted from the light assembly 124. The diffusion plate 129 may diffuse light, emitted from the light assembly 124, upward.

The optical sheet 125 may be disposed in front of the diffusion plate 129. A rear surface of the optical sheet 125 may face the diffusion plate 129, and a front surface of the optical sheet 125 may face the rear surface of the display panel 110.

The optical sheet 125 may include at least one or more sheets. More specifically, the optical sheet 125 may include one or more prism sheets and/or one or more diffusion sheets. The plurality of sheets included in the optical sheet 125 may be adhered to each other and/or in close contact with each other.

The optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or position of the diffusion sheet and the prism sheet may vary.

The diffusion sheet may prevent light, emitted from the diffusion plate, from being partially concentrated, allowing light to be more evenly distributed. The prism sheet may collect light emitted from the diffusion sheet to cause light to be incident perpendicular to the display panel 110.

The coupling portion 125d may be formed on at least one of sides or edges of the optical sheet 125. At least one of the first to third optical sheets 125a to 125c may be provided with the coupling portion 125d.

The coupling portion 125d may be formed on a long side or an edge of the optical sheet 125. The coupling portion 125d formed on the first long side and the coupling portion 125d formed on the second long side may be asymmetric to each other. For example, the coupling portion 125d at the first long side and the second coupling portion 125d at the second long side may be different in position and/or number from each other.

Figure 4:
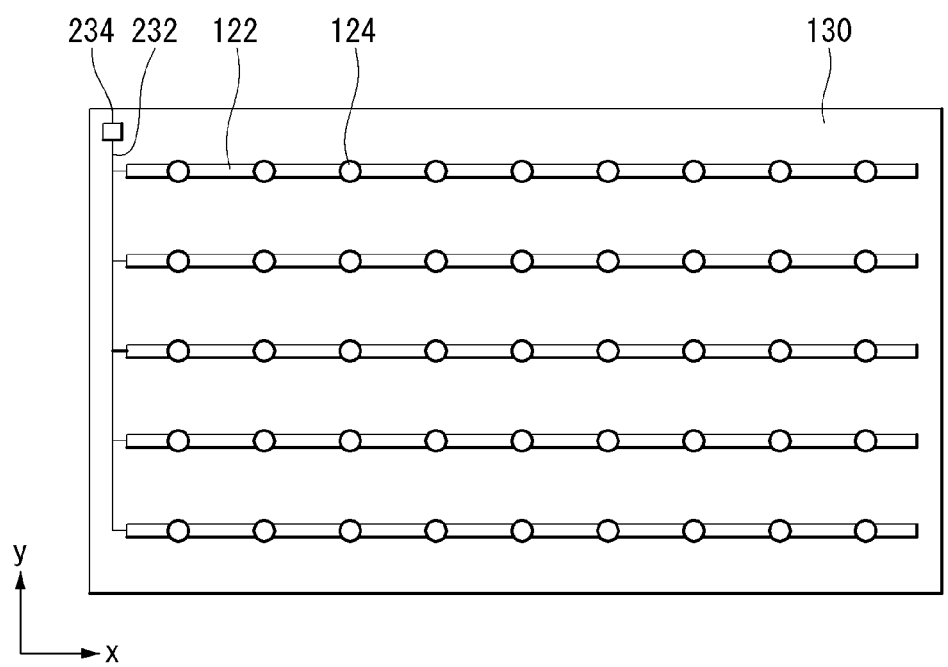

Referring to FIG. 4, the substrate 122 may be formed with a plurality of straps extending in a first direction on the frame 30 and spaced apart from each other at predetermined intervals in a second direction perpendicular to the first direction. A plurality of substrates 122 may be connected at one side to a wiring electrode 232.

The wiring electrode 232 may extend in the second direction. The wiring electrode 232 may be connected to one side of the substrate 122 with a predetermined distance therebetween in the second direction.

A wiring hole 234 may be formed at one end of the wiring electrode 232. The wiring hole 234 may be a fine hole formed through the frame 130. The wiring electrode 232 may extend to a rear surface of the frame 130 through the wiring hole 234. The wiring electrode 232 may be electrically connected with an adapter (not shown) positioned on the rear surface of the frame 130 through the wiring hole 234.

The light assemblies 124 may be mounted on the substrate 122 at predetermined intervals in the first direction. The diameter of each of the light assemblies 124 may be greater than the width of the substrate 122 in the second direction.

Figure 5:
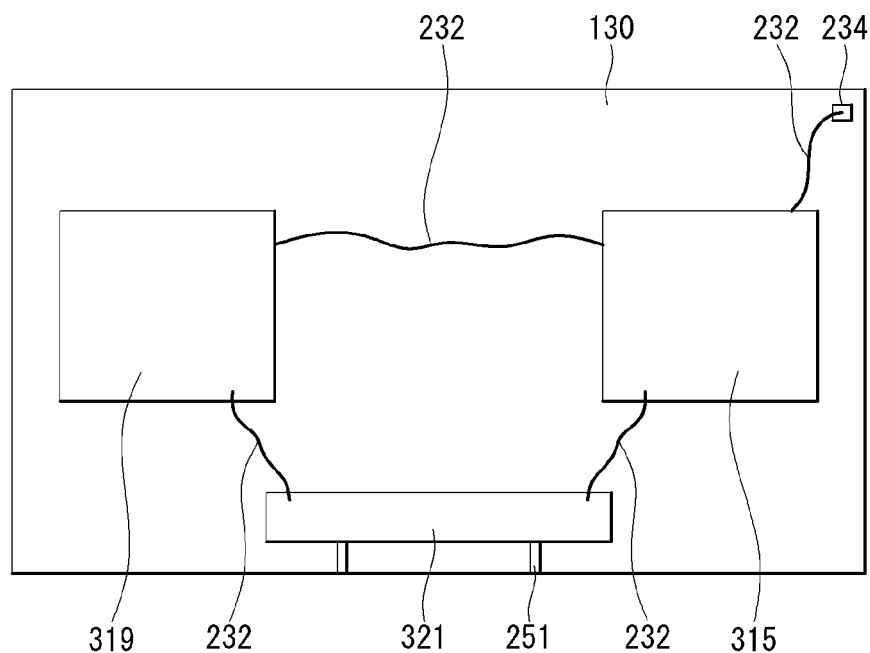

Referring to FIG. 5, the wiring electrode 232 that extends from the front surface of the frame 130 through the wiring hole 234 may be electrically connected to a power supply 315. The power supply 315 may be a PCB configured to supply power to the display device 100. The power supply 315 may convert AC power into DC power.

The power supply 315 may supply a current to the light assembly 124 through the wiring electrode 232. The power supply 315 may be electrically connected with a main board 321 via the wiring electrode 232. The main board 321 may be spaced apart from the power supply 315 by a predetermined distance.

The main board 321 may be a PCB that provides an interface for operating the display device 100. In addition, the main board 321 may check and manage an operating state of each of the components of the display device 100.

The main board 321 and the power supply 315 may be electrically connected to a T-CON board 319 via the wiring electrode 232. The T-CON board 319 may be a PCB configured to transfer power or a signal, input from the main board 321 or the power supply 315, to the display panel 110. The T-CON board 319 may be electrically connected with the display panel 110 at the front surface of the frame 130 via a flat flex cable (FFC) 251.

Although, it is illustrated that the respective PCBs are connected to each other, but the present disclosure is not limited thereto, and only at least some of the PCBs may be connected to each other.

Figure 6:
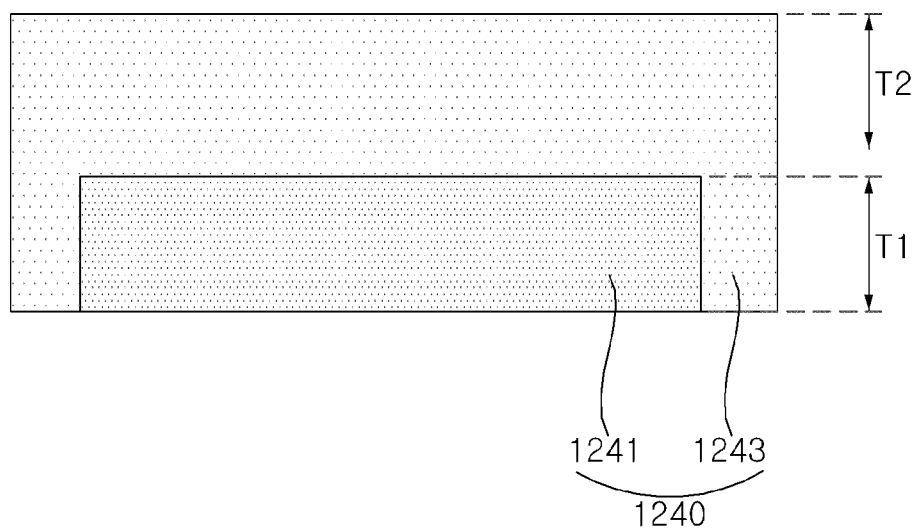
FIGS. 6 and 7 are views illustrating examples of a light source provided in a display device according to an embodiment of the present disclosure.

Referring to FIG. 6, a light source 1240 may be, for example, an LED package. The LED package may include a flip chip. The light source 1240 may include an LED chip 1241 and an encapsulant 1243. For example, the LED chip 1241 may have a thickness T1 of 200 micrometers. The encapsulant 1243 may include a phosphor. For example, the LED chip 1241 may be a blue LED, and the phosphor included in the encapsulant 1243 may be a yellow-based or red-based phosphor. Accordingly, the light source 1240 may provide white light. For example, the encapsulant 1243 may have a thickness T2 of 200 micrometers. The encapsulant 1243 may surround the LED chip 1241. The encapsulant 1243 may be referred to as a fluorescent layer 1243. The fluorescent layer 1243 may be omitted. When the fluorescent layer 1243 is excluded, a fluorescent sheet may be provided between the display panel 110 and the light source 1240. The fluorescent sheet may include a yellow-based phosphor and/or a red-based phosphor.

Figure 7:
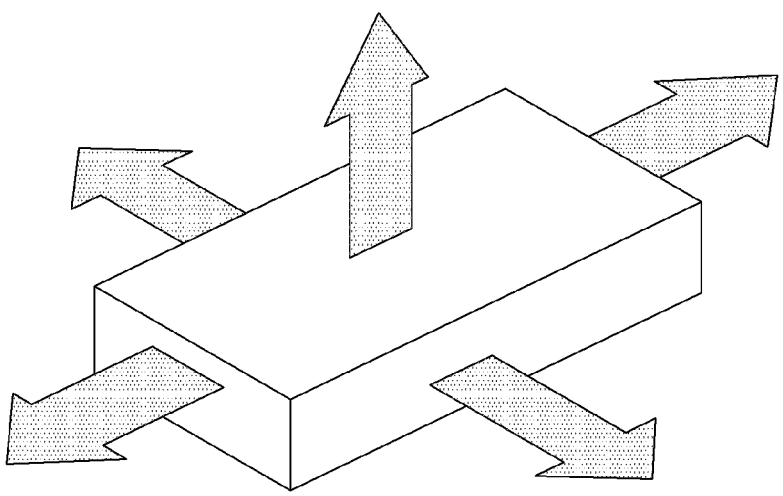
Figure 8:
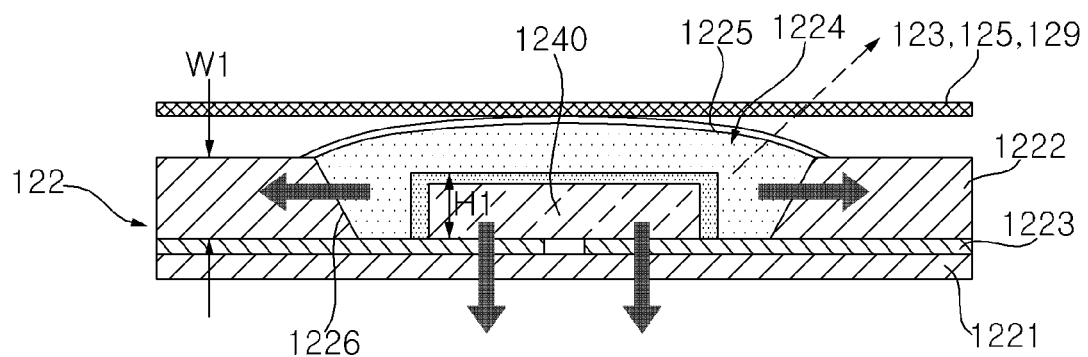
FIGS. 8 to 21 are views illustrating examples of a backlight unit provided in a display device according to an embodiment of the present disclosure.

Referring to FIGS. 7 and 8, the light source 1240 may emit light in multiple directions. The light source 1240 may be an LED capable of emitting light from five surfaces. For example, the LED may be of a flip-chip type.

The substrate 122 may include a first substrate 1221, a second substrate 1222, and a conductive layer 1223. The first substrate 1221 may contain a metal. For example, the metal may be Al. The conductive layer 1223 may be printed on the first substrate 1221. The conductive layer 1223 may contain a metal. For example, the metal may be Cu. The conductive layer 1223 may be a printed circuit. The second substrate 1222 may be stacked on the conductive layer 1223. The second substrate 1222 may contain a metal. For example, the metal may be Al. The second substrate 1222 may be etched. As the second substrate 1222 is etched, the conductive layer 1223 may be exposed to the outside. As the second substrate 1222 is etched, a light source groove 1226 may be defined.

The light source 1240 may be disposed in the light source groove 1226. The light source 1240 may be electrically connected to the conductive layer 1223, and may be disposed on the first substrate 1221 and the conductive layer 1223 of the substrate 122. The light source 1240 may be in contact with the conductive layer 1223. For example, the light source 1240 may be a flip-chip LED. A height H1 of the light source 1240 may be less than a thickness W1 of the second substrate 1222. Due to the etched second substrate 1222, the light source 1240 may be buried on the substrate 122 to thereby prevent damage to the light source 1240 that may occur during an assembly process.

A light source cap 1224 may cover exposed surfaces of the first substrate 1221 and the conductive layer 1223 while surrounding lateral and upper surfaces of the light source 1240. For example, the light source cap 1224 may be made of a silicon material. As another example, the light source cap 1224 may be made of an epoxy material. As another example, the light source cap 1224 may be made of liquid glass. The light source cap 1224 may be referred to as a light source lens 1224 or a lens 1224. The light source cap 1224 may fill the etched first substrate 1221 and the conductive layer 1223. The light source cap 1224 may define a flat upper surface 1225 or a convex upper surface 1225.

Heat generated from the light source 1240 may be transferred to the first substrate 1221, the second substrate 1222, and/or the conductive layer 1223. Heat generated from the light source 1240 may be directly transferred to the first substrate 1221 through the conductive layer 1223. Heat generated from the light source 1240 may be absorbed through the second substrate 1222. That is, heat generated from the light source 1240 may not only be transferred to a lower side of the light source 1240, but to a lateral side of the light source 1240, allowing the heat generated from the light source 1240 to be effectively dissipated.

The optical layer 123, the optical sheet 125, or the diffusion plate 129 may be spaced apart from the substrate 122 and the light source 1240. The light source cap 1224 may be in contact with the optical layer 123, the optical sheet 125, or the diffusion plate 129. Accordingly, light with high luminance (or brightness) may be provided to the display panel 110 (see FIGS. 1 and 2).

Figure 9:
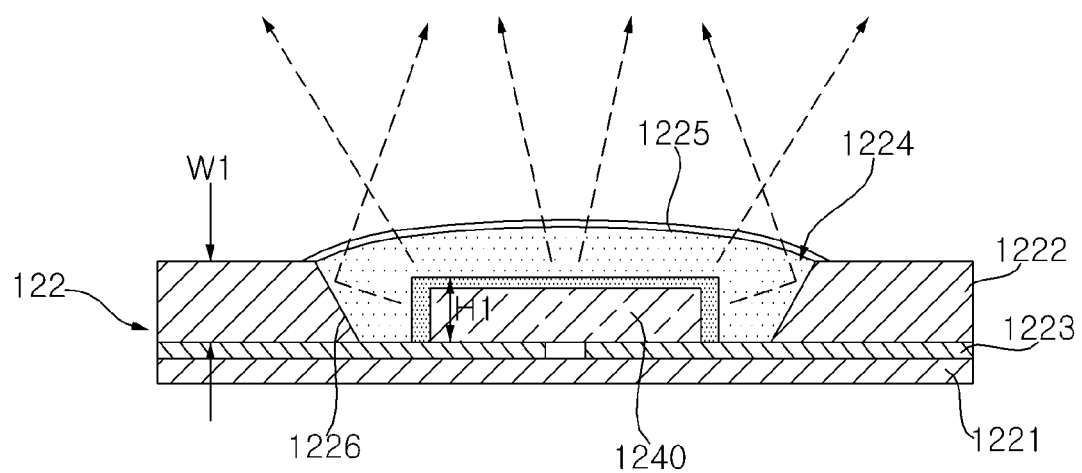

Referring to FIG. 9, light provided by the light source 1240 may be directed to an outside of the substrate 122 through the light source cap 1224. Light from an upper surface of the light source 1240 may be dispersed and spread in various directions through the light source cap 1224. Light from a side surface of the light source 1240 may be reflected from the second substrate 1222 and then be directed to the outside through the light source cap 1224. Accordingly, a beam angle of light provided by the light source 1240 may be improved.

Figure 10:
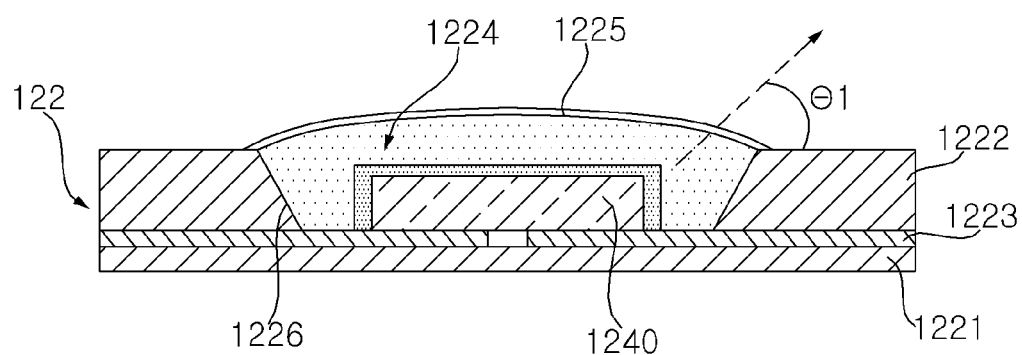

Referring to FIG. 10, an upper surface 1225 of the light source cap 1224 may be convex. A beam angle of light provided by the light source 1240 and emitted to the outside through the light source cap 1224 may be a first angle theta 1. The first angle theta 1 may be less than a beam angle of light provided by the light source 1240 without the light source cap 1224.

Figure 11:
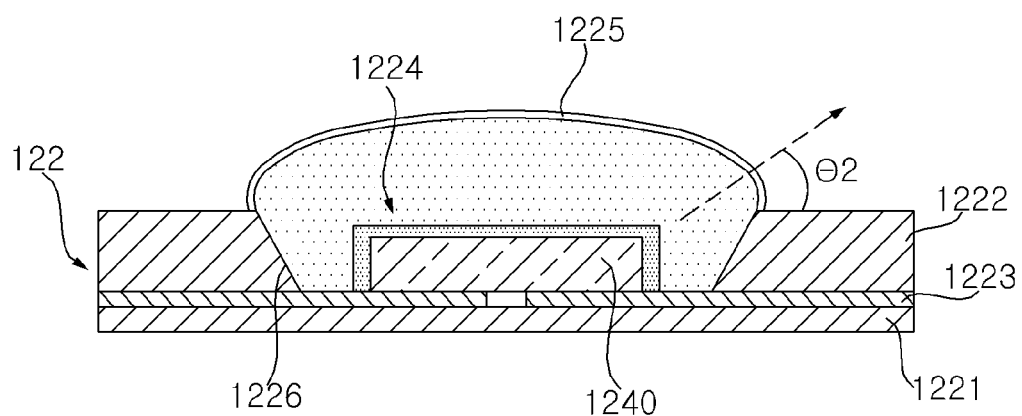

Referring to FIG. 11, an upper surface 1225 of a light source cap 1224 may be more convex than the upper surface 1225 of the light source cap 1224 described with reference to FIG. 10. A curvature of the light source cap 1224 of FIG. 11 may be greater than a curvature of the light source cap 1224 of FIG. 10. A beam angle of light provided by the light source 1240 and emitted to the outside through the light source cap 1224 may be a second angle theta 2. The second angle theta 2 may be less than the first angle theta 1. Accordingly, the beam angle of light provided by the light source 1240 may be improved.

Figure 12:
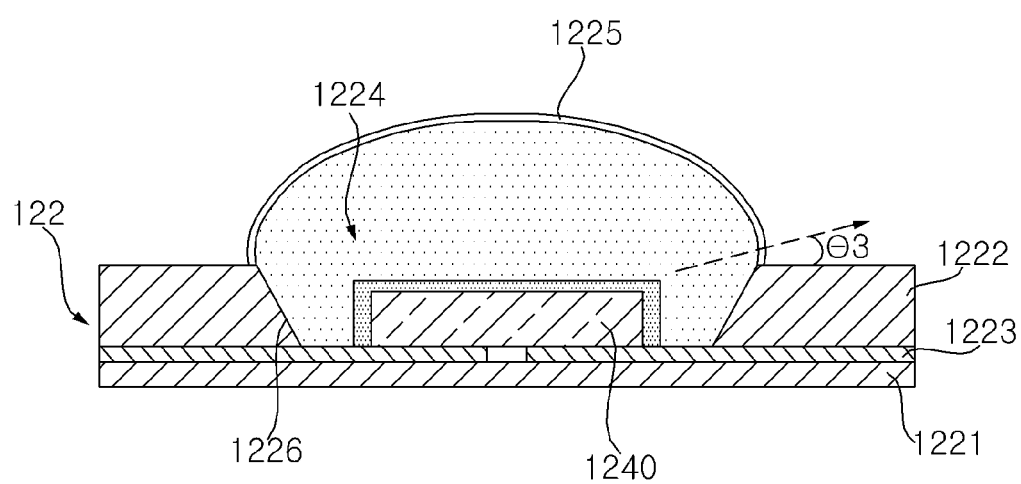
Figure 13:
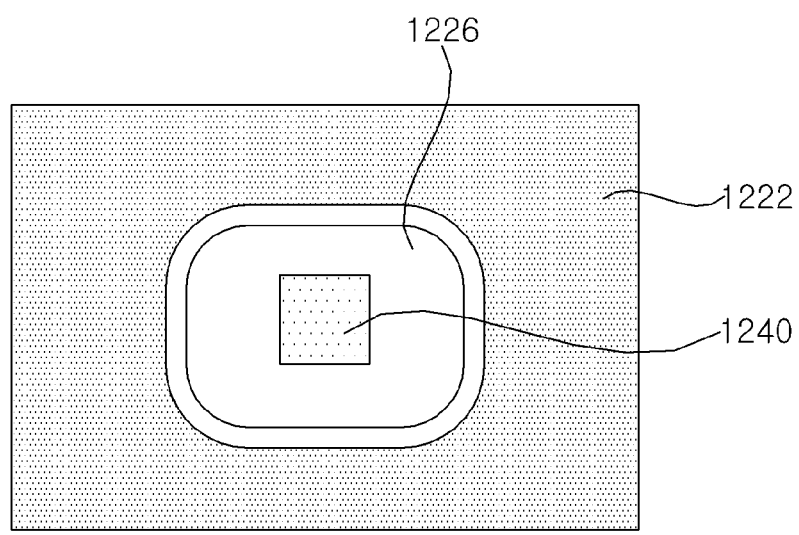
Figure 14:
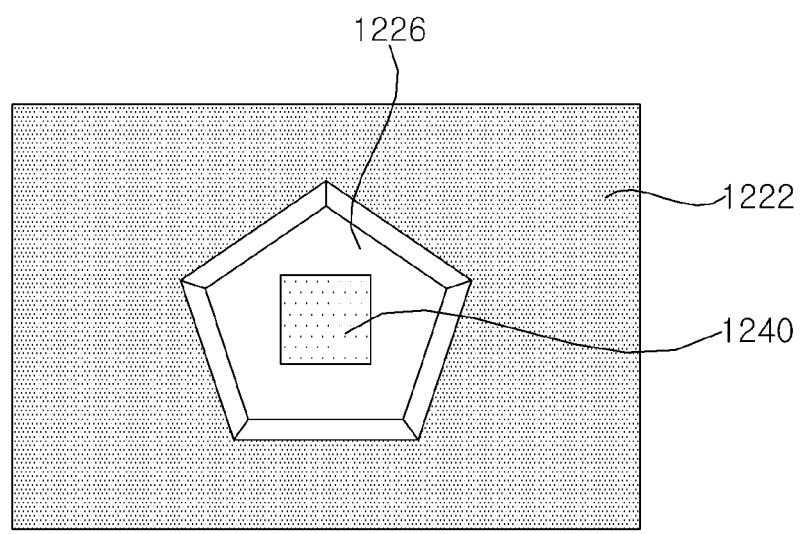
Figure 15:
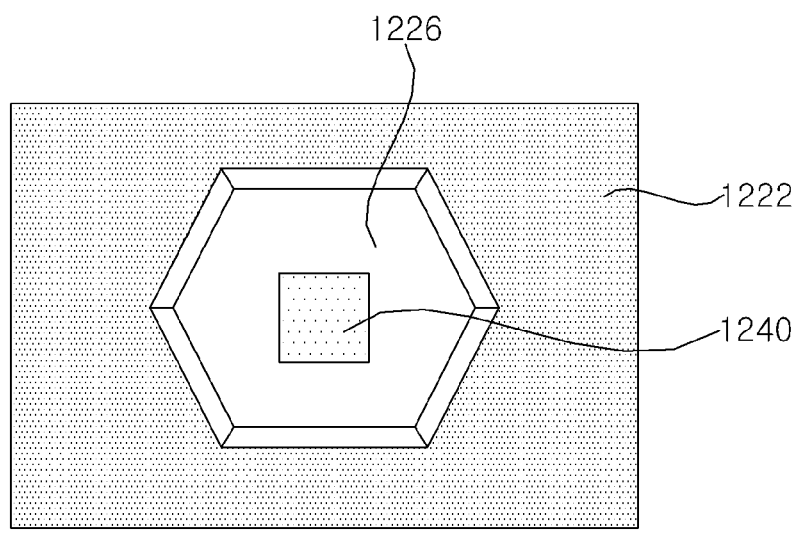
Figure 16:
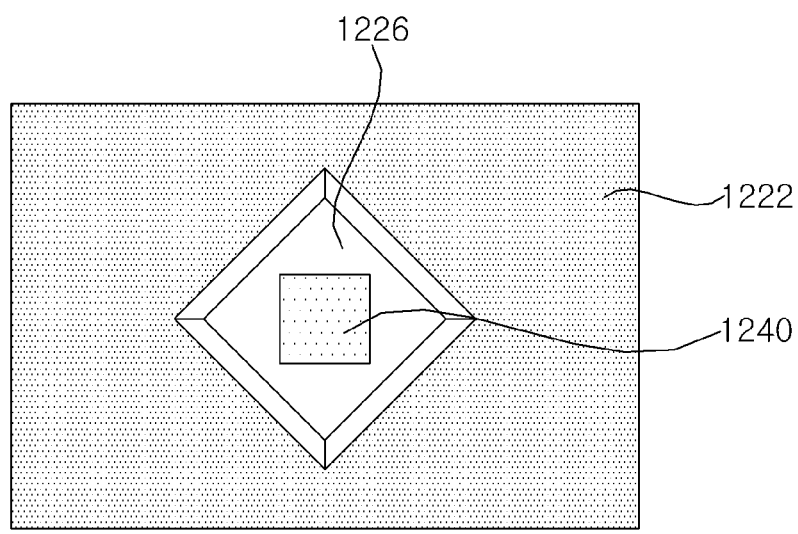
Figure 17:
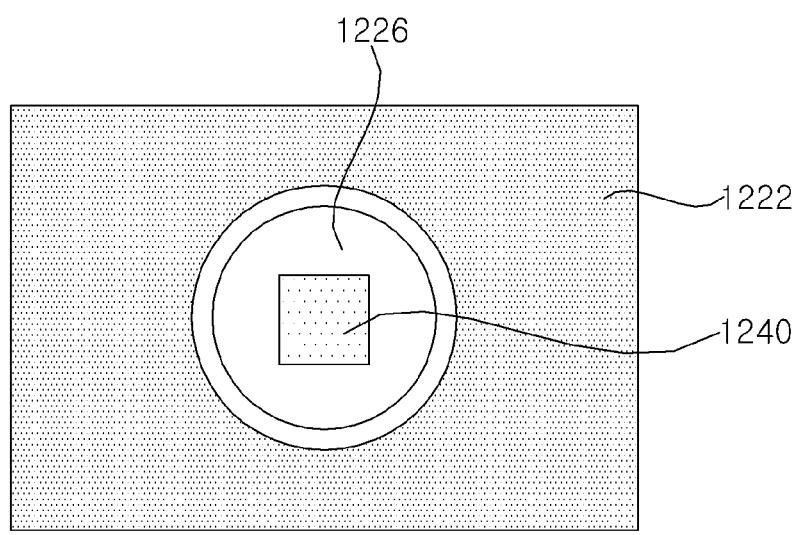

Referring to FIG. 12, an upper surface 1225 of a light source cap 1224 may be more convex than the upper surface 1225 of the light source cap 1224 described with reference to FIG. 11. A curvature of the light source cap 1224 of FIG. 12 may be greater than the curvature of the light source cap 1224 of FIG. 11. A beam angle of light provided by the light source 1240 and emitted to the outside through the light source cap 1224 may be a third angle theta 3. The third angle theta 3 may be less than the second angle theta 2. Accordingly, the beam angle of light provided by the light source 1240 may be improved.

Referring to FIGS. 13 to 17, the light source groove 1226 may have a rectangular shape with rounded corners. Light provided by the light source 1240 may be reflected by the light source groove 1226, allowing light uniformity to be improved.

The light source groove 1226 may have a pentagonal shape. Light provided by the light source 1240 disposed in the pentagonal light source groove 1226 may be reflected by the light source groove 1226 to thereby deliver increased light uniformity compared to light provided by the light source 1240 disposed in the rectangular light source groove 1226.

The light source groove 1226 may have a hexagonal shape. Light provided by the light source 1240 disposed in the hexagonal light source groove 1226 may be reflected by the light source groove 1226 to thereby deliver increased light uniformity compared to light provided by the light source 1240 disposed in the pentagonal light source groove 1226.

The light source groove 1226 may have a rhombus shape. Light provided by the light source 1240 disposed in the rhombus light source groove 1226 may be reflected by the light source groove 1226 to thereby deliver increased light uniformity compared to light provided by the light source 1240 disposed in the hexagonal light source groove 1226.

The light source groove 1226 may have a circular shape. Light provided by the light source 1240 disposed in the circular light source groove 1226 may be reflected by the light source groove 1226 to thereby deliver increased light uniformity compared to light provided by the light source 1240 disposed in the rhombus light source groove 1226.

Figure 18:
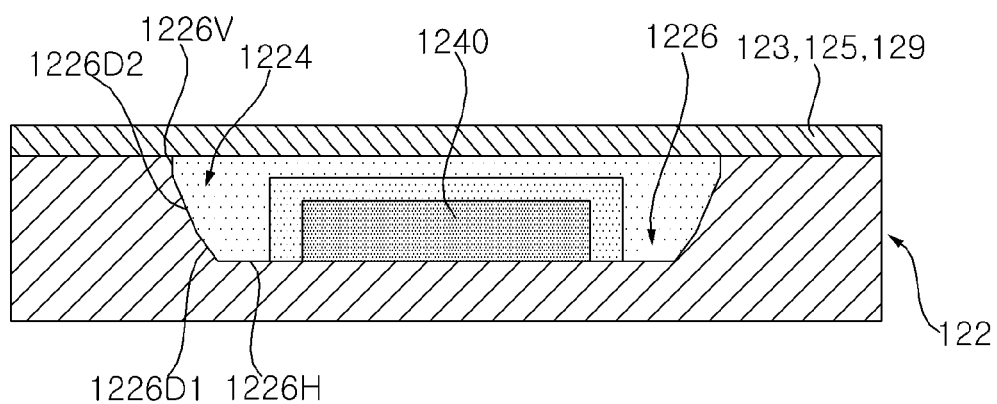

Referring to FIG. 18, the light source groove 1226 may include a horizontal portion 1226H, an inclined portion 1226D, and a vertical portion 1226V. The horizontal portion 1226H may be formed on the first substrate 1221 (see FIG. 8) and/or the conductive layer 1223 (see FIG. 8).

The inclined portion 1226D may include a first inclined portion 1226D1 and a second inclined portion 1226D2. The inclined portion 1226D may be formed around the horizontal portion 1226H. The first inclined portion 1226D1 may extend from the horizontal portion 1226H, and the second inclined portion 1226D2 may extend from the first inclined portion 1226D1.

An angle formed by the first inclined portion 1226D1 with respect to the horizontal portion 1226H may be greater than an angle formed by the second inclined portion 1226D2 with respect to the horizontal portion 1226H. The vertical portion 1226V may extend from the second inclined portion 1226D2. For example, the vertical portion 1226V may form 90° with respect to the horizontal portion 1226H.

Figure 19:
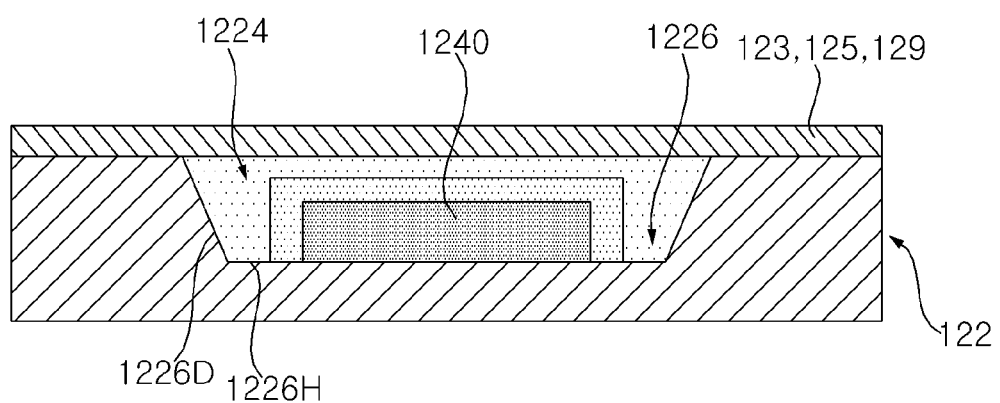

Referring to FIG. 19, the light source groove 1226 may include a horizontal portion 1226H and an inclined portion 1226D. The horizontal portion 1226H may be formed on the first substrate 1221 (see FIG. 8) and/or the conductive layer 1223 (see FIG. 8).

The inclined portion 1226D may be formed around the horizontal portion 1226H. The inclined portion 1226D may extend from the horizontal portion 1226H. An angle formed by the inclined portion 1226D with respect to the horizontal portion 1226H may be an obtuse angle. Accordingly, a beam angle of light provided by the light source 1240 may be improved compared to a beam angle of light provided by the light source of the light source groove 1226 described with reference to FIG. 18.

Figure 20:
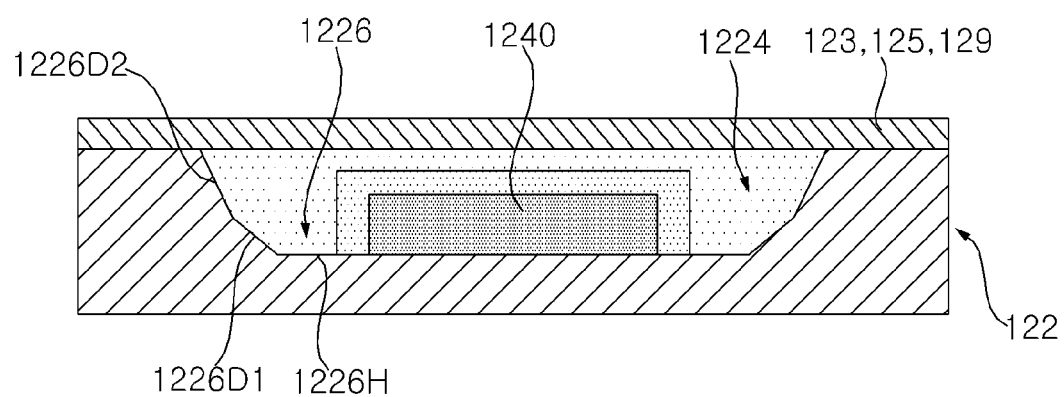

Referring to FIG. 20, the light source groove 1226 may include a horizontal portion 1226H and an inclined portion 1226D. The horizontal portion 1226H may be formed on the first substrate 1221 (see FIG. 8) and/or the conductive layer 1223 (see FIG. 8).

The inclined portion 1226D may include a first inclined portion 1226D1 and a second inclined portion 1226D2. The inclined portion 1226D may be formed around the horizontal portion 1226H. The first inclined portion 1226D1 may extend from the horizontal portion 1226H, and the second inclined portion 1226D2 may extend from the first inclined portion 1226D1.

An angle formed by the first inclined portion 1226D1 with respect to the horizontal portion 1226H may be greater than an angle formed by the second inclined portion 1226D2 with respect to the horizontal portion 1226H. Accordingly, a beam angle of light provided by the light source 1240 may be improved compared to the beam angle of light provided by the light source of the light source groove 1226 described with reference to FIG. 19.

Figure 21:
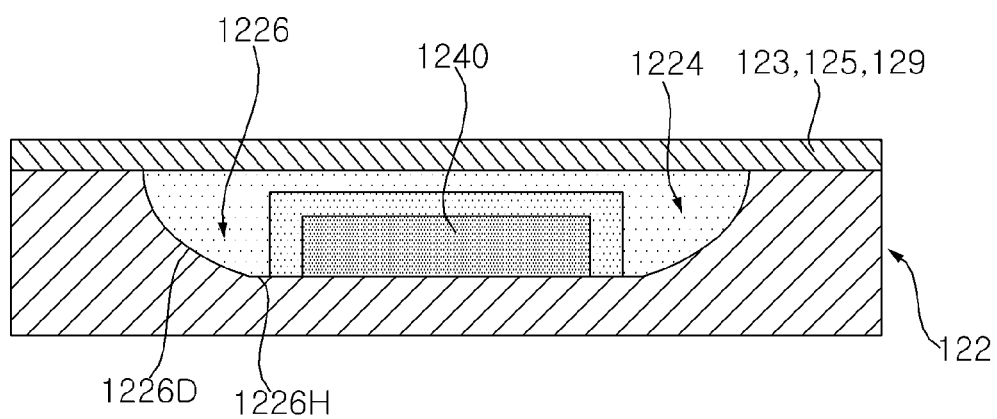

Referring to FIG. 21, the light source groove 1226 may include a horizontal portion 1226H and an inclined portion 1226D. The horizontal portion 1226H may be formed on the first substrate 1221 (see FIG. 8) and/or the conductive layer 1223 (see FIG. 8).

The inclined portion 1226D may be formed around the horizontal portion 1226H. The inclined portion 1226D may extend from the horizontal portion 1226H. An angle formed by the inclined portion 1226D with respect to the horizontal portion 1226H may be an obtuse angle. The inclined portion 1226D may be inwardly recessed into the substrate 122. Accordingly, a beam angle of light provided by the light source 1240 may be improved compared to the beam angle of light provided by the light source of the light source groove 1226 described with reference to FIG. 19.

Referring to FIGS. 1 to 21, a display device according to an aspect of the present disclosure includes: a display panel; a frame disposed at a rear of the display panel; a substrate disposed between the display panel and the frame; and a light source mounted on the substrate and configured to provide light to the display panel, wherein the substrate includes: a first substrate; a conductive layer stacked on the first substrate; a second substrate stacked on the conductive layer; and a light source groove formed by removing a portion of the second substrate to allow the conductive layer to be exposed therethrough, and wherein the light source is disposed in the light source groove and is electrically connected to the conductive layer.

According to another aspect of the present disclosure, the display device may further include a light source cap filled in the light source groove to cover the second substrate, the conductive layer, and the light source.

According to another aspect of the present disclosure, a height of the light source may be less than a thickness of the second substrate, and a height of the light source cap may be substantially equal to the thickness of the second substrate.

According to another aspect of the present disclosure, a height of the light source may be less than a thickness of the second substrate, and a height of the light source cap may be greater than the thickness of the second substrate.

According to another aspect of the present disclosure, the light source cap may outwardly protrude from the substrate toward the display panel.

According to another aspect of the present disclosure, the display device may further include an optical layer disposed between the display panel and the substrate. The light source cap may be in contact with the optical layer.

According to another aspect of the present disclosure, the light source groove may include: a horizontal portion formed on the conductive layer; and an inclined portion formed on the second substrate. An angle formed by the inclined portion with respect to the horizontal portion may be an obtuse angle.

According to another aspect of the present disclosure, the inclined portion may include: a first inclined portion extending from the horizontal portion; and a second inclined portion extending from the first inclined portion. A first angle formed by the first inclined portion with respect to the horizontal portion may be greater than a second angle formed by the second inclined portion with respect to the horizontal portion.

According to another aspect of the present disclosure, the light source groove may further include a vertical portion extending from the second inclined portion and connected to an outer surface of the second substrate.

According to another aspect of the present disclosure, the inclined portion may be inwardly recessed into the second substrate.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a frame disposed at a rear of the display panel;
a substrate disposed between the display panel and the frame;
a light source coupled to the substrate and providing light to the display panel; and
an optical layer disposed between the display panel and the substrate,
wherein the substrate comprises:
a first substrate;
a conductive layer located on the first substrate;
a second substrate located on the conductive layer;
a light source groove formed in a portion of the second substrate,
wherein the light source is disposed in the light source groove and is electrically connected to the conductive layer; and
a light source cap located in the light source groove, and covering the portion of the second substrate and the light source,
wherein a height of the light source is less than a thickness of the second substrate,
wherein a height of the light source cap is substantially equal to the thickness of the second substrate, and
wherein the optical layer covers the substrate and the light source cap such that the optical layer is in contact with both of the light source cap and the substrate.

2. The display device of claim 1, wherein the light source groove comprises:
a horizontal portion formed relative to the conductive layer; and
an inclined portion formed relative to the portion of the second substrate, and
wherein an angle formed by the inclined portion with respect to the horizontal portion is an obtuse angle.

3. The display device of claim 2, wherein the inclined portion comprises:
a first inclined portion extending from the horizontal portion; and
a second inclined portion extending from the first inclined portion, and
wherein a first angle formed by the first inclined portion with respect to the horizontal portion is greater than a second angle formed by the second inclined portion with respect to the horizontal portion.

4. The display device of claim 3, wherein the light source groove further comprises a vertical portion extending from the second inclined portion and connected to an outer surface of the second substrate.

5. The display device of claim 2, wherein the inclined portion is inwardly recessed into the second substrate.

6. The display device of claim 1, wherein the light source groove comprises:
a horizontal portion formed parallel to a top side of the conductive layer; and
an inclined portion extending from the top side of the conductive layer and being adjacent to the second substrate, and
wherein an angle formed by the inclined portion with respect to the horizontal portion is an obtuse angle.

7. A display device comprising:
a display panel;
a frame disposed at a rear of the display panel;
a substrate disposed between the display panel and the frame;
a light source coupled to the substrate and providing light to the display panel; and
an optical layer disposed between the display panel and the substrate,
wherein the substrate comprises:
a first substrate;
a conductive layer located above the first substrate;
a second substrate located above the conductive layer, wherein the second substrate is shaped to define a light source groove that permits a portion of the conductive layer to be exposed,
wherein the light source is located in the light source groove and is electrically connected to the conductive layer; and
a light source cap located in the light source groove, and covering the portion of the second substrate and the light source,
wherein a height of the light source is less than a thickness of the second substrate,
wherein a height of the light source cap is substantially equal to the thickness of the second substrate, and
wherein the optical layer covers the substrate and the light source cap such that the optical layer is in contact with both of the light source cap and the substrate,
wherein the light source groove comprises:
a horizontal portion formed relative to the conductive layer; and
an inclined portion formed relative to the portion of the second substrate, and
wherein an angle formed by the inclined portion with respect to the horizontal portion is an obtuse angle,
wherein the inclined portion comprises:
a first inclined portion extending from the horizontal portion; and
a second inclined portion extending from the first inclined portion,
wherein a first angle formed by the first inclined portion with respect to the horizontal portion is greater than a second angle formed by the second inclined portion with respect to the horizontal portion, and,
wherein the light source groove further comprises a vertical portion extending from the second inclined portion and connected to an outer surface of the second substrate.

* * * * *